A. HUNTINGTON & J. HICKS.
GRAIN-SEPARATOR.

No. 187,634. Patented Feb. 20, 1877.

WITNESSES:
J. R. Smith
A. H. Schattenberg

INVENTORS:
Alfred Huntington
John Hicks

UNITED STATES PATENT OFFICE.

ALFRED HUNTINGTON AND JOHN HICKS, OF MILWAUKEE, WISCONSIN.

IMPROVEMENT IN GRAIN-SEPARATORS.

Specification forming part of Letters Patent No. 187,634, dated February 20, 1877; application filed June 20, 1876.

*To all whom it may concern:*

Be it known that we, ALFRED HUNTINGTON and JOHN HICKS, of Milwaukee, in the county of Milwaukee, in the State of Wisconsin, have invented certain Improvements in Cockle-Separators, of which the following is a specification:

Our invention has for its object separating cockle and other seeds from grain, and is a machine with a perforated reel and an endless indented platform, which takes up the cockle and seeds and carries them up over the end of the platform and empties them out into a spout, which conveys them out of the machine, while the grain slips down over the platform and falls out at the other end of the machine.

Figure 1:
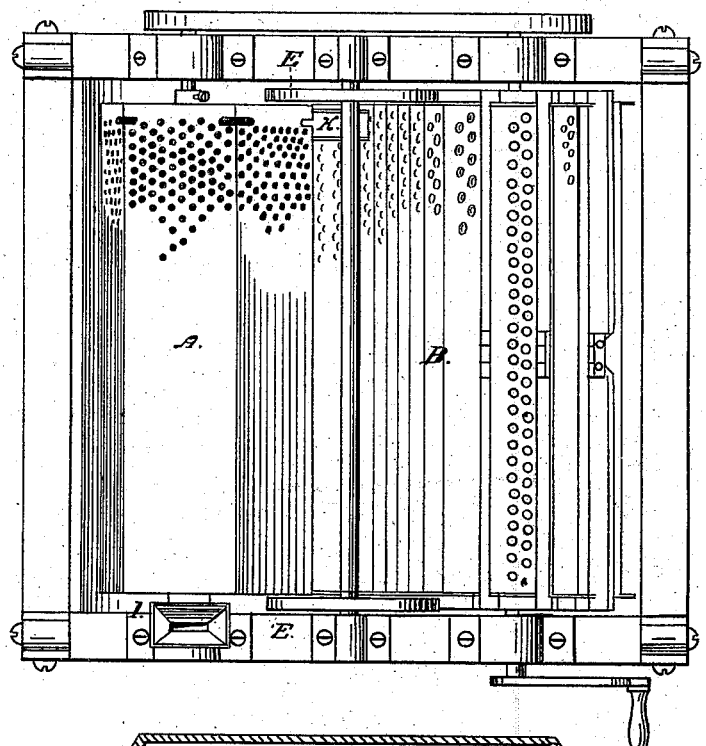
Figure 2:
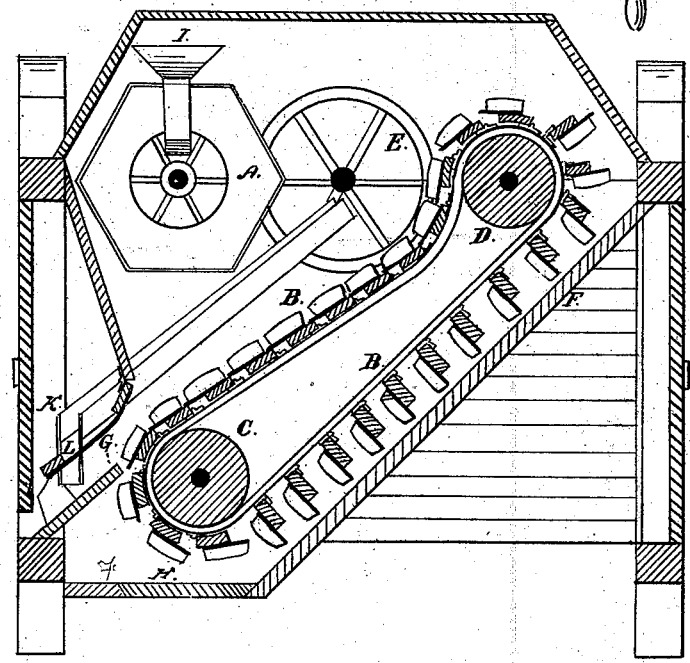

Figure 1 is a plan view of our invention, and Fig. 2 a sectional view of same.

A is the perforated reel; B, the indented endless platform; C, the lower drum, over which the endless platform runs; D, the upper drum, over which the platform runs; E E, wheels which press and run on the edges of the platform and keep it down; F, a board or platform, onto which the cockle and seeds fall and run over and out of the opening H; G, a sliding board over which the grain runs from the endless platform; H, opening for the cockle and seeds to run out of; I, the feed-hopper of the machine; K, a spout which conveys the coarse grain from the machine; L, a piece of material which holds the grain down as it passes over the board G.

The operation of this machine is as follows: The grain is fed into the machine through the feed-hopper I, into the reel A, and, as the grain and seeds fall through onto the endless platform, which is in operation, the grain will slide down over the platform, and fall out through over the board G, while the cockle and seeds will fall into the indentations in the platform, and be carried up over same, and fall out over onto platform F.

We claim—

1. A cockle-separator constructed as follows: with reel A, endless pitted platform B, wheels E, cockle-board F, grain-board G, and grain-holder L, arranged substantially as described.

2. Indented endless platform B, grain-board G, grain-holder L, and cockle-board F, all in combination, substantially as described.

ALFRED HUNTINGTON.
JOHN HICKS.

Witnesses:
J. B. SMITH,
A. A. SCHATTENBERG.